3,053,816
POLYMERS CONTAINING SULFUR
Bobbie D. Stone, Miamisburg, Ohio, assignor to Monsanto Chemical Company, St. Louis, Mo., a corporation of Delaware
No Drawing. Filed Dec. 21, 1959, Ser. No. 860,680
7 Claims. (Cl. 260—79.1)

This invention relates to the production of plastic rubber-like material having certain valuable properties. More particularly this invention relates to the production of moldable solid rubber-like materials from certain dithioalcohols and thionyl chloride.

According to this invention there are provided new and valuable rubbery polymers by reacting substantially equimolar proportions of an alkanedithiol compound having from 4 to 6 carbon atoms with the thiol or mercaptan radicals attached to the terminal carbons thereof with thionyl chloride. The polymer obtained thereby has an empirical chemical constitution of approximately $$(C_xH_{2x}S_{2.5})_n$$

where $x$ is a whole number of from 4 to 6 and $n$ represents the number of units in the polymer. Neither the structure nor the exact molecular weight of the polymer are definitely known. However, it is believed that the polymer has a molecular arrangement of the type $$[-S-(CH_2)_x-S-S-S-(CH_2)_x-S-]_n$$

where $x$ and $n$ are as defined above. From the evidence available it is believed that $n$ has a value on the order of 10, to 100, giving the polymeric material molecular weight on the order of 3000 to 30,000.

The obtaining of this rubber like polymer by this method is critical in that rubbery polymers are not obtained when these alkanedithiols are reacted with other sulfur chlorides, such as sulfur dichloride and sulfuryl chloride. Similarly, rubbery polymers are not obtained when alkanedithiols of lower carbon content, such as 1,2 ethanedithiol, are reacted with thionyl chloride. In all of those cases, hard crumbly waxes are obtained. The reaction of this invention proved to be more complex and to yield a polymer completely different in physical properties from polymers obtained from other sulfur chlorides.

The thionyl chloride and the 4 to 6 carbon alkanedithiol reactant can be contacted in any known manner. For example, the thionyl chloride can be added to the alkanedithiol reactant, or the alkanedithiol reactant can be added to the thionyl chloride. Also the reactants may be added simultaneously to the reaction vessel. In any event, the reaction is preferably carried out in the presence of an inert diluent, such as chloroform, ethyl ether, dioxane, alkylene chlorides, e.g. methylene chloride, hydrocarbons, such as benzene, toluene, etc. However, such inert diluents or solvents are not essential to the conduct of the reaction.

Reaction between the thionyl chloride and the alkanedithiol materials can be conducted at ordinary, decreased, or elevated temperatures. Temperatures on the order of $-20°$ to $80°$ C. can readily be used with temperatures of from $0°$ to $80°$ C. being preferred.

When the thionyl chloride and 4 to 6 carbon alkanedithiol are combined, the initial reaction is exothermic and continues to evolve heat until one half of the thionyl chloride has been consumed. Up to this point, only HCl is evolved and sulfur from the thionyl chloride stays in the polymer. After half of the reaction is completed, e.g., when one half of the molar quantities of thionyl chloride has been reacted, the reaction is no longer exothermic and both HCl and a sulfur containing gas are evolved. The exact nature of the chemical reaction is not known but it is believed that this reaction involves the following equations, when the alkanedithiol is 1,5-pentanedithiol:

(I)
$$2HS(CH_2)_5SH + SOCl_2 \longrightarrow$$
$$HS-(CH_2)_5-S-\underset{\underset{O}{\|}}{S}-S-(CH_2)_5-SH + HCl$$

(II)
$$nHS(CH_2)_5-S-\underset{\underset{O}{\|}}{S}-S-(CH_2)_5-SH + nSOCl_2 \longrightarrow$$
$$[-S-(CH_2)-S-S-S-(CH_2)_5-S-]_n + nSO_2 + 2HCl$$

In the first step, thionyl chloride couples two molecules of the alkanedithiol forming a dimer with the linkage —S—S(O)—S—. In the second step, this —(O)— group is reduced while the terminal mercapto groups are oxidized to polymeric disulfide groups. The end result is a polymer with alternating di- and trisulfide linkages.

The following examples illustrate embodiments of the invention.

EXAMPLE 1

1,5-pentanedithiol (28.65 g.–0.2102 moles) was dissolved in 170 ml. of distilled chloroform and placed in a 4-necked 500 ml. flask equipped with a stirrer, reflux condenser, thermometer, and dropping funnel. The condenser exit led to two bubbler bottles in series each containing 30 g. of sodium hydroxide in 100 ml. of water. The system was flushed with nitrogen and then 24.75 g. (0.208 mole) of freshly distilled thionyl chloride in 70 ml. of chloroform was added through the dropping funnel into the pentanedithiol solution while maintaining the temperature of the reaction mixture at about 10° C. The first half of the thionyl chloride was added over 30 minutes. Thereafter the heat evolution subsided and the remainder of the thionyl chloride was added in 5 minutes. The reaction mixture was stirred for 1 hour at 0°–5° C., then heated at reflux temperature for an hour and a half. Finally the chloroform was distilled off and the polymer was heated under vacuum to 75° C. for 30 minutes. Then chloroform was added again to dissolve the polymer and the resulting solution was poured into excess hexane using good agitation to precipitate the polymer. The polymer was dried over night in a vacuum desiccator. The rubber-like polymer product weighed 26.4 g.

|  | Found | Calcd. for $C_5H_{10}S_{2.5}$ |
|---|---|---|
| Percent C | 40.19 | 40.00 |
| Percent H | 6.74 | 6.66 |
| Percent S | 52.47 | 53.33 |

EXAMPLE 2

This example, illustrated by the reaction of 1,2-ethanedithiol with thionyl chloride shows that the products obtained by the use of lower alkanedithiols do not produce rubber-like plastic products.

The reaction between 1,2-ethanedithiol and thionyl chloride was carried out in the same manner as in Example 1, using 0.251 mole (29.8 g.) of thionyl chloride in 5 ml. of distilled chloroform and a cooled stirred solution of 0.254 mole (23.92 g.) of 1,2-ethanedithiol in 100 ml. of distilled chloroform. After completion of the reaction, the mixture was heated to boiling and refluxed for 1 hour, during which time the powdery precipitate originally present melted and turned yellow. After cooling, the mixture was poured into 1500 ml. of hexane. The product was a hard, crumbly, solid.

EXAMPLE 3

This example shows the results obtained when sulfur dichloride was reacted with 1,5-pentanedithiol. A solution of (7.60 g.) sulfur dichloride in 100 ml. of chloroform was added dropwise to a cooled, stirred solution of 1,5-pentanedithiol (0.078 mole, 10.07 g.) in 500 ml. of chloroform. The system was closed and a stream of dry nitrogen gas was swept through the apparatus and then through a series of bubblers containing standard NaOH solution. During the 0.5 hour required to add the sulfur dichloride solution, the temperature of the reaction mixture was held between 3° and 8° C. The mixture was refluxed for 1 hour. After cooling to 3° C., an additional 1 g. of 1,5-pentanedithiol was added (to insure conversion of end groups to —SH groups). The solution was then evaporated to about ⅓ volume and poured into 800 ml. of hexane. After standing overnight, the hexane was decanted and the white polymeric product dried in vacuo. There was thus obtained 8.4 g. (68% of theory) of a hard wax melting at 67–71° C. and giving an X-ray diffraction pattern which indicated that it was crystalline.

EXAMPLE 4

The procedure of Example 3 was repeated except that sulfuryl chloride was used in place of sulfur dichloride or thionyl chloride. The product obtained was a hard, crumbly, foul-smelling wax, melting at 39° C.

The polymeric material of this invention may be compounded with lubricants, fillers, curing accelerators, plasticizers, reinforcing agents, etc. and cured to produce valuable rubber materials. Various amounts of certain metal oxide pigments such as zinc oxide, cupric oxide, and lead peroxide are added to the composition being prepared for curing to prevent the chemical reversion of the polymeric material to the uncured state. Some organic materials such as polynitrobenzenes, and benzoyl peroxides are useful for this reversion prevention function but they are not as effective as the metallic oxides. A sample of polymer prepared in the manner described in Example 1 was compounded with the ingredients listed in Table 1, cured for 30 minutes at 292° F., and tested to determine the physical properties of the resulting composition.

TABLE 1

| | |
|---|---|
| Polymer | 100 |
| Stearic acid | 0.5 |
| Benzothiazyldisulfide | 0.6 |
| Diphenylquanidine | 0.6 |
| Zinc oxide | 20 |
| Spheron 9 [1] | 30 |
| Sterling S [2] | 30 |

*Properties.—Stress—Strain*

| | |
|---|---|
| 100% modulus (p.s.i.) | 390 |
| 300% modulus (p.s.i.) | 935 |
| Tensile strength (p.s.i.) | 1000 |
| Ultimate elongation (percent) | 345 |
| Permanent set (percent) | 2.9 |

[1] Spheron 9—is easy processing channel (EPC) carbon black.
[2] Sterling S—semi-reinforcing furnace (SFR) carbon black.

The sulfur-containing rubbers provided by this invention have good solvent resistant properties, as shown by the following table.

TABLE 2

*Swelling Resistance*

| Solvent: | Percent volume increase after 7 days at 25° C. |
|---|---|
| Isooctane | 2.1 |
| n-Hexane | 9.0 |
| Carbon tetrachloride | 76.4 |
| Benzene | 124.4 |
| Ethylacetate | 11.1 |
| Acetone | 9.6 |
| n-Butanol | 0.4 |

The rubber-like moldable, solid sulfur-containing polymeric materials of this invention are useful for a wide variety of purposes. They are useful in molding operations; in sheet formation, in coating compositions, and as electrical insulation. They may also be useful in rocket fuel compositions where low sulfur content polysulfide polymers are desired.

While the invention has been described with particular reference to various preferred embodiments thereof, it will be appreciated that modifications and variations are possible without departing from the invention. For example, mixed polymers or interpolymers of the alkanedithiols may be prepared by reacting a mixture of alkanedithiols with thionyl chloride. In such case, the molar amount of thionyl chloride used must be equivalent to the total molar quantities of the individual alkanedithiols used.

What is claimed is:

1. The process which comprises reacting substantially equimolar proportions of an alkanedithiol compound having from 4 to 6 carbon atoms and having the thiol radicals attached to the terminal carbon atoms and thionyl chloride until substantial polymerization has taken place.

2. The process which comprises reacting substantially equimolar proportions of an alkanedithiol compound having from 4 to 6 carbon atoms and having the thiol radicals attached to the terminal carbon atoms and thionyl chloride at temperatures of from —20° to 80° C. in an inert diluent liquid until substantial polymerization has taken place.

3. The process which comprises reacting substantially equimolar proportions of 1,5-pentanedithiol with thionyl chloride at temperatures of from 3° to 80° C. in an inert diluent liquid until substantial polymerization has taken place.

4. The sulfur-containing rubber-like polymer prepared by the process of claim 1.

5. The sulfur-containing rubber-like polymer prepared by the process of claim 2.

6. The sulfur-containing rubber-like polymer prepared by process of claim 3.

7. A cured rubber-like material comprising the polymerization product of about equal molar amounts of an alkanedithiol having from 4 to 6 carbon atoms and having the thiol radicals on the terminal carbon atoms and thionyl chloride, and a curing agent.

References Cited in the file of this patent

UNITED STATES PATENTS 2,510,567    Flory _____ June 6, 1950